(12) United States Patent
Totsuka

(10) Patent No.: US 8,059,319 B2
(45) Date of Patent: Nov. 15, 2011

(54) SOLID-STATE IMAGING APPARATUS

(75) Inventor: Hirofumi Totsuka, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 753 days.

(21) Appl. No.: 12/181,413

(22) Filed: Jul. 29, 2008

(65) Prior Publication Data

US 2009/0034032 A1 Feb. 5, 2009

(30) Foreign Application Priority Data

Aug. 3, 2007 (JP) ................................. 2007-202990

(51) Int. Cl.
*H04N 1/46* (2006.01)
(52) U.S. Cl. ........ 358/513; 358/482; 358/443; 248/308; 248/340
(58) Field of Classification Search .................. 358/513, 358/482, 483, 512, 514, 515, 520, 408, 443; 348/302, E3.026, E5.091, 308, 340, 283, 348/281, 273, 279, 222.1, 272
See application file for complete search history.

(56) References Cited

U.S. PATENT DOCUMENTS

| | | | | |
|---|---|---|---|---|
| 4,139,278 A * | 2/1979 | Matsumoto et al. | ............ | 345/94 |
| 4,974,072 A * | 11/1990 | Hasegawa | ...................... | 358/514 |
| 5,453,611 A | 9/1995 | Oozu et al. | ................. | 250/208.1 |
| 5,757,520 A * | 5/1998 | Takashima | .................... | 358/513 |
| 6,624,849 B1 * | 9/2003 | Nomura | ......................... | 348/241 |
| 6,961,158 B2 * | 11/2005 | Spears | .......................... | 358/513 |
| 7,148,927 B2 | 12/2006 | Ogura et al. | .................. | 348/281 |
| 7,728,894 B2 * | 6/2010 | Chou | .............................. | 348/302 |
| 7,760,260 B2 * | 7/2010 | Murata et al. | ................. | 348/304 |
| 2002/0093694 A1 * | 7/2002 | Spears | .......................... | 358/474 |
| 2003/0193585 A1 | 10/2003 | Ogura et al. | .................. | 348/272 |
| 2004/0032628 A1 * | 2/2004 | Sato et al. | ...................... | 358/514 |
| 2004/0150733 A1 * | 8/2004 | Nagayoshi et al. | ........... | 348/272 |
| 2006/0169871 A1 | 8/2006 | Kochi | ......................... | 250/208.1 |
| 2007/0013785 A1 * | 1/2007 | Kinoshita et al. | ........... | 348/222.1 |
| 2007/0052831 A1 | 3/2007 | Ogura et al. | ................... | 348/308 |

FOREIGN PATENT DOCUMENTS

| | | |
|---|---|---|
| JP | 6-204445 | 7/1994 |
| JP | 2003-7996 | 1/2003 |
| JP | 2003-51989 | 2/2003 |
| JP | 2003-87503 | 3/2003 |
| JP | 2003-259227 | 9/2003 |
| JP | 2006-211363 | 8/2006 |

* cited by examiner

*Primary Examiner* — Negussie Worku
(74) *Attorney, Agent, or Firm* — Fitzpatrick, Cella, Harper & Scinto

(57) ABSTRACT

A solid-state imaging apparatus, of lower power consumption and a smaller area with maintaining sufficient performance, includes a plurality of pixels for reading a plurality of color components, a plurality of holding units holding a signal from each pixel, a plurality of common output lines to which the plurality of respective holding units corresponding to respective color components are connected, and a plurality of output circuits connected to the plurality of common output lines. Then, at least two of the plurality of common output lines are connected to one of the plurality of output circuits through a selecting unit. In addition, outputs of a holding unit to which pixels of at least two different color components among the plurality of pixels in the unit cell are connected are connected to one of the plurality of common output lines through a selecting unit.

14 Claims, 17 Drawing Sheets

SOLID-STATE IMAGING APPARATUS

BACKGROUND OF THE INVENTION

1. Field of the Invention

The present invention relates to a solid-state imaging apparatus used for image reading apparatuses, such as a copier and a scanner.

2. Description of the Related Art

As image reading apparatuses, such as a copier, what reads both of a monochromatic image and a color image has spread. In recent years, there is a sensor having one line of cells for monochromatic image reading in addition to pixel (color pixel) columns for three lines corresponding to respective color components of R (red), G (green) and B (blue) as a solid-state imaging apparatus mounted in these image reading apparatuses. That is, sensors with 4-line construction which have a pixel (monochrome pixel) column for one more line for monochromatic image reading have been used. As these sensors, for example, construction shown in FIG. 2 in Japanese Patent Application Laid-Open No. 2003-087503 or FIG. 6 in Japanese Patent Application Laid-Open No. 2003-007996 is mentioned.

In addition, there is construction shown in FIG. 13 in Japanese Patent Application Laid-Open No. H06-204445 as an example of a four-line sensor which performs charge-voltage conversion for every pixel in a post-stage of a photoelectric conversion element represented by a MOS type. That is, besides the photoelectric conversion element and charge-voltage conversion unit, it includes a signal hold capacitor for every pixel and a capacitor writing switch to the signal hold capacitor, and a common output line for every color and an output transfer switch of every pixel to the common output line. Furthermore, it is constructed of a shift register, which scans every pixel, and open and close each transfer switch to a horizontal output line, and each output unit for every color. In addition in the subject, it has construction of having not only RGB pixels, but also photoelectric conversion elements for non-visible light.

In addition, when performance improvement such as improvement in an S/N ratio is required, circuitry of a sensor as shown in Japanese Patent Application Laid-Open No. 2006-211363 may be adopted. The circuitry in FIG. 1 of Japanese Patent Application Laid-Open No. 2006-211363 has another line of holding capacitors besides one line of signal holding capacitors, and another line of holding capacitors holds noise components generated in the photoelectric conversion element for every pixel and the charge-voltage conversion unit.

Then, in the output unit including a differential amplifier, the noise component is removed by taking difference between the signal component held and noise component held by each holding capacitor. In addition, there may be construction of having a gain amplifier in a pre-stage of two holding capacitors as showed in FIG. 1 of Japanese Patent Application Laid-Open No. 2003-051989 for improvement in an S/N ratio.

In conventional image reading apparatuses, as described in Japanese Patent Application Laid-Open No. 2003-087503, since only color pixel signals are used at the time of color image reading, constituent elements such as an output unit, a holding capacitor, and a gain amplifier which are connected to a monochromatic pixel column in the solid-state imaging apparatus with 4-line construction are not used. Thus, they consume vainly electric power of each constituent element connected to the monochromatic pixel column at the time of color image reading.

Similarly, they consume vainly electric power of each constituent element connected to the color pixel column also at the time of monochromatic image reading. In addition, since each constituent element which is not needed at the time of each image reading is arranged, it becomes a factor of consuming a useless area and a factor of cost hike of a sensor.

SUMMARY OF THE INVENTION

The present invention aims to provide a solid-state imaging apparatus with lower power consumption and a smaller area in comparison with the former with maintaining performance equivalent to the former.

Other features and advantages of the present invention will be apparent from the following description taken in conjunction with the accompanying drawings, in which like reference characters designate the same or similar parts throughout the figures thereof.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
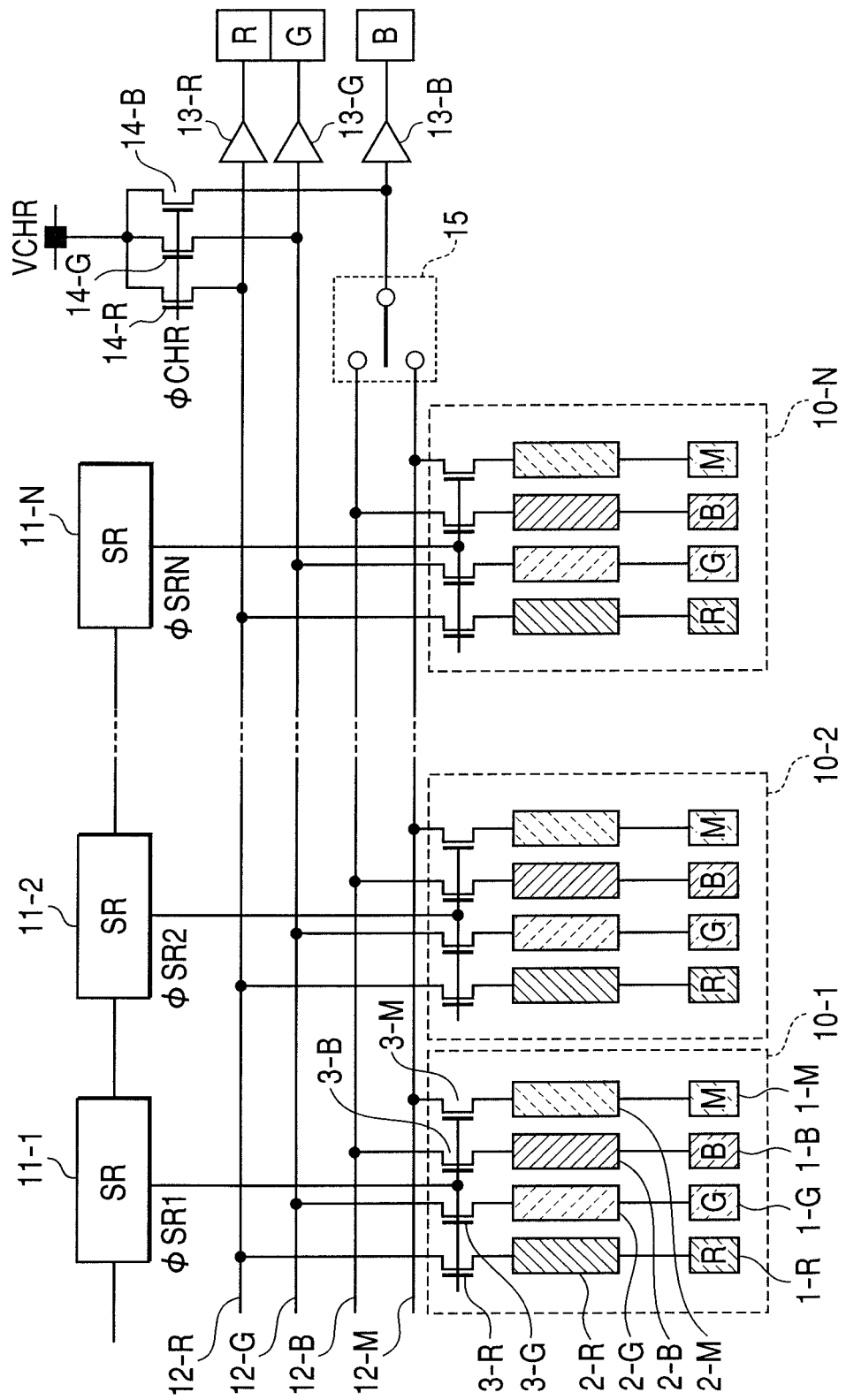
FIG. 1 is a block diagram illustrating a first embodiment of a solid-state imaging apparatus of the present invention.

FIG. 1 is a block diagram illustrating a first embodiment of a solid-state imaging apparatus according to the present invention. FIG. 1 illustrates an N bits×4 line sensor which reads four components, that is, red (R), green (G), blue (B) and monochromatic (M) components. In the figure, R, G, B and M which are attached as end symbols of a pixel 1 mean red (R), green (G), blue (B) and monochromatic (M) pixels, respectively. That is, as illustrated as 1-R, 1-G, 1-B and 1-M, the pixels are provided with corresponding to red (R), green (G), blue (B) and a monochrome (M). In addition, in that case, a plurality of pixels 1-R, 1-G, 1-B and 1-M for reading a plurality of color components is arranged in one direction by plural pixels in a column manner, as illustrated in FIG. 1.

A holding unit 2 is connected to each pixel, and an output transfer switch 3 opens and closes a switch in response to a control signal from a shift register mentioned later. A unit cell 10 is constructed of the pixel 1, holding unit 2, and output transfer switch 3, and is defined as 1 bit. The shift register (SR) 11 performs sequential access to the unit cell for every bit, and the holding unit 2 for every color is connected through the output transfer switch 3 to a common output line 12.

As for the unit cell, a plurality of unit cells is arranged in a column manner as illustrated as 10-1, 10-2 and 10-N. The shift registers are arranged with corresponding to respective unit cells as illustrated as 11-1, 11-2 and 11-N.

Here, the holding units 2 are shown as 2-R corresponding to red (R), 2-G corresponding to green (G), 2-B corresponding to blue (B), and 2-M corresponding to monochrome (M), similarly to the pixels 1. The output transfer switches 3 are also the same. Furthermore, the common output lines 12, output circuits 13, and common output line reset transistors 14 which are mentioned later are also the same.

The output circuits 13 are connected to the common output lines 12, and the common output line reset transistors 14 reset the common output lines 12. A first selecting unit 15 selects either of a common output line 12-B of a B component, and a common output line 12-M of an M component, and outputs it to an output circuit 13-B.

Although the B component and M component share the output circuit 13-B in FIG. 1, the B component may be another color component (R or G), or if necessary, three or more output circuits may be shared. In addition, the common output line reset transistors 14 may be connected to a stage prior to the first selecting unit 15 to be connected to the common output lines 12 of four components, that is, R, G, B and M.

Figure 2:
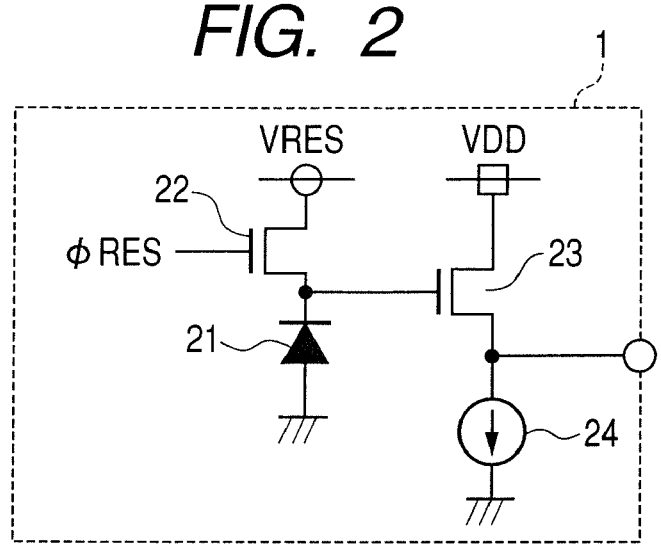
FIG. 2 is a circuit diagram showing an example of a pixel.

An example of the pixel 1 is illustrated in FIG. 2. FIG. 2 illustrates a photoelectric conversion element 21, a reset transistor 22 for resetting the photoelectric conversion element 21, an input transistor 23 of a source follower receiving a signal of the photoelectric conversion element 21, and a current regulator circuit 24 of the source follower. The current regulator circuit 24 is realizable, for example, by a MOS transistor in which a gate electrode is fixed to a constant voltage, a drain electrode is connected to a source electrode of the source follower input transistor and a source electrode is connected to a power source.

Figure 3:
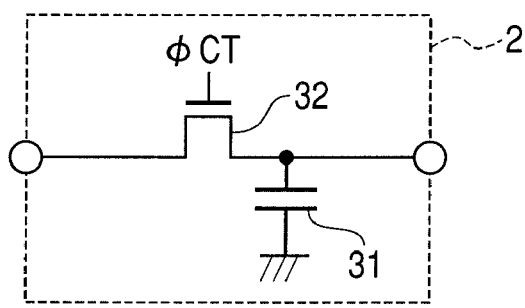
FIG. 3 is a circuit diagram showing an example of a holding unit.

The holding unit 2 can be constructed of, for example, a signal holding capacitor 31 and a first capacitor writing switch 32 as illustrated in FIG. 3. As the output circuit 13, a gain amplifier with a certain gain is usually used in most cases.

Figure 4:
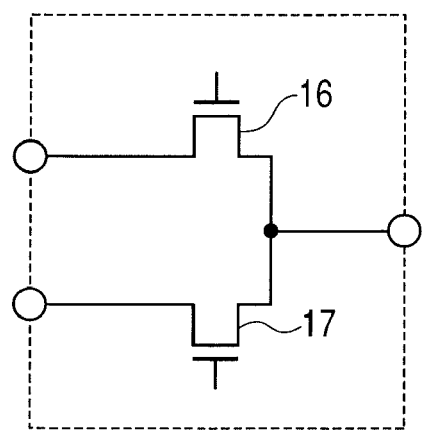
FIG. 4 is a circuit diagram showing an example of first to third selecting units.

For example, as illustrated in FIG. 4, the first selecting unit 15 can be constructed of a first selection transistor 16 and a second selection transistor 17. For example, when both transistors are NMOS transistors, drain electrodes of the both transistors are connected, which are connected to the output circuit 13-B as an output, and respective source electrodes of the both transistors are connected to the common output lines 12-B and 12-M, respectively.

Furthermore, a controlling signal line is connected to each gate electrode of the both transistors. Then, the common output line, connected to the source electrode of the selection transistor to which the controlling signal line in a High level is connected, can be connected to the output circuit 13 which is connected to a post-stage of the first selecting unit 15. Although it is described as an NMOS transistor in this example, it may be a PMOS transistor or a CMOS switch (combination of NMOS and PMOS transistors). In those cases, what is necessary is just to input into each gate electrode a voltage level which is suitable for each through the controlling signal line.

Next, an operation of this embodiment will be described using FIG. 5. Here, let the first selecting unit 15 select the common output line 12-B of the B component at the time of color image reading or select the common output line 12-M of the M component at the time of monochromatic image reading, which is connected to the output circuit 13-B. In the case of color image reading, reference symbol ΦRES denotes a control signal of the reset transistor 22 (refer to FIG. 2), and ΦCT denotes a control signal of the first capacitor writing switch 32 (refer to FIG. 3). Output signals ΦSR1 to ΦSRN of 1 to N bit of the shift registers 11 control open/close of the output transfer switches 3 of respective unit cells 10.

Figure 5:
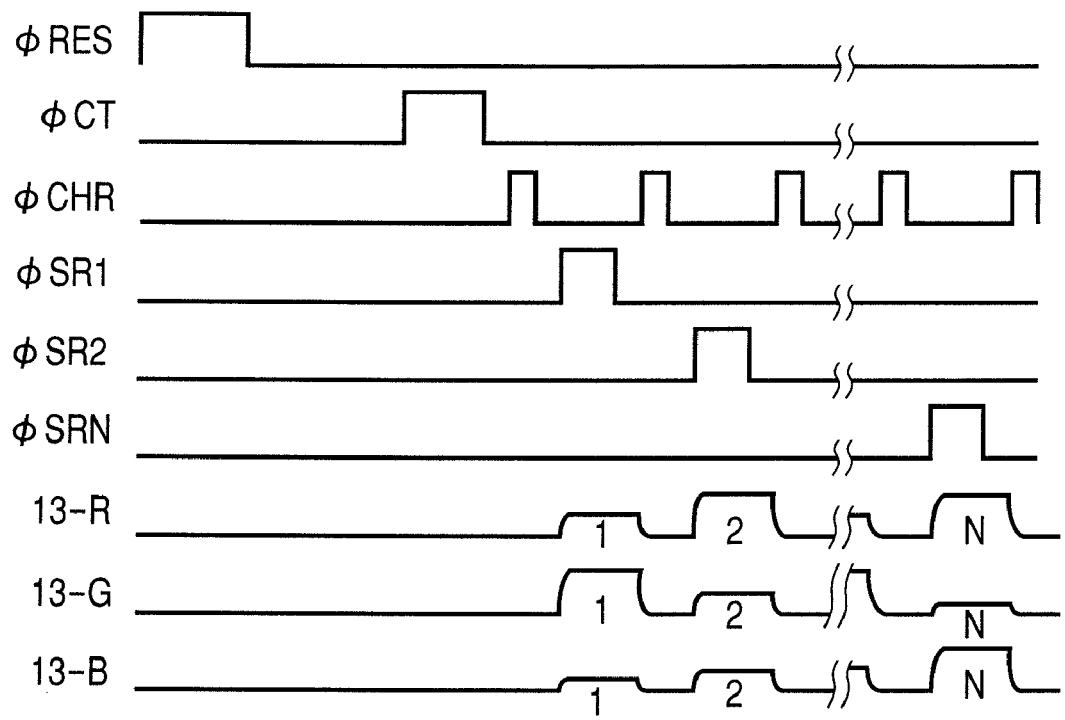
FIG. 5 is a timing chart illustrating an operation of the first embodiment.

In addition, it is assumed that each transistor or switch in the circuits of FIGS. 2 and 3 becomes conductive when the control signal of FIG. 5 is in a High level, and is cut off when being in a Low level. Furthermore, reference symbols 13-R, 13-G and 13-B in FIG. 5 denote output signal waveforms of respective output circuits 13-R, 13-G and 13-B.

While ΦRES is a High period, the photoelectric conversion element 21 of each color component is reset in a voltage VRES through the reset transistor 22. When ΦRES falls, an incident optical signal is stored in a mode of being converted into signal charges in the photoelectric conversion element 21. The stored signal charges are given electric charge amplification by the source follower and are output as a voltage signal from the pixel 1. An electric signal of each color component output from the pixel 1 during the ΦCT being a High period is sampled by the signal holding capacitor 31 through the first capacitor writing switch 32, and its value is held in falling of the ΦCT.

While the ΦCHR is High, each common output line 12 is reset in a voltage VCHR through the common output line reset transistor 14 (refer to FIG. 1). The ΦSR1 rises after the ΦCHR falls, and the signal of each color component held by the signal holding capacitor 31 through the output transfer switch 3 in the unit cell 10-1 which is a first bit is output to each common output line 12. At this time, the signal output to the common output line 12 has amplitude obtained by multiplying signal amplitude, held by the signal holding capacitor 31, by a gain G determined by the following formula.

$$G = CT/(CT+CH) \quad (1)$$

CT in Formula (1) is a capacity value of the signal holding capacitor 31, and CH is a capacity value of each common output line 12. Hereinafter, a signal of each color component is output to each common output line 12 from each unit cell 10 one by one after reset of each common output line 12. Each output circuit 13 multiplies a signal of each color component, output to each common output line 12, by an arbitrary gain to output the product from an output terminal.

Here, since the common output line 12-B of the B component is connected to the output circuit 13-B in the first selecting unit 15 at the time of color image reading, the signal of the B component is output from the output circuit 13-B. Similarly, signals of the R component and G component are output from the output circuit 13-R and 13-G, respectively.

On the other hand, since the common output line 12-M of the M component is connected to the output circuit 13-B by the first selecting unit 15 at the time of monochromatic image reading, a signal of the M component is output from the output circuit 13-B.

Figure 6:
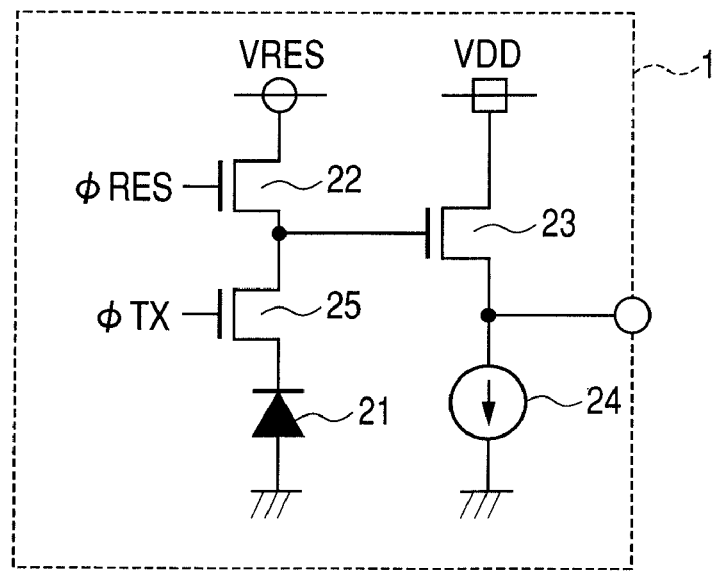
FIG. 6 is a circuit diagram showing another example of a pixel.

Up to now, although the pixel 1 is described in construction of FIG. 2, construction illustrated in FIG. 6 may be used besides this. In FIG. 6, the same reference symbols are applied to components common to those in FIG. 2, and their descriptions are omitted. In FIG. 6, a transfer transistor 25 transfers a signal from the photoelectric conversion element 21. In addition, although these are not shown, parasitic capacitance which exists in a source electrode of the reset transistor 22, a gate electrode of the source follower input transistor 23, and a drain electrode of the transfer transistor 25, and wiring which connects these three electrodes is called a floating diffusion region (floating diffusion region: a floating diffusion unit, an FD unit).

Figure 7:
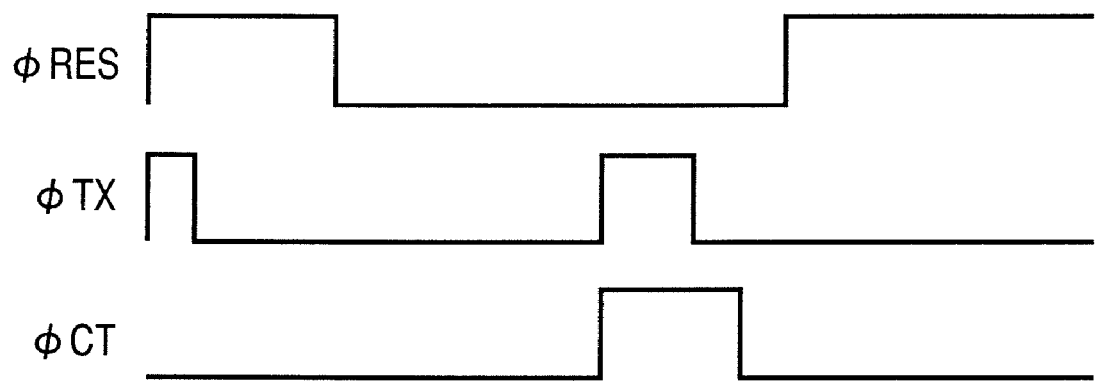
FIG. 7 is a timing chart illustrating an operation of the element in FIG. 6.

Next, an operation in that case will be described using FIG. 7. In FIG. 7, reference symbol ΦTX denotes a control signal of the transfer transistor 25. As illustrated in FIG. 7, the photoelectric conversion element 21 is reset in a voltage VRES while the ΦRES and ΦTX are High. In addition, the FD unit not shown is reset in FIG. 6 while the ΦRES is High.

When the ΦTX falls, accumulation starts in the photoelectric conversion element 21. At this time, an incident optical signal is converted into signal charges, which are stored in the photoelectric conversion element 21. When the ΦTX rises after the ΦRES falls, the signal charges stored in the photoelectric conversion element 21 are transferred to the FD unit. The transferred signal charges are given electric charge amplification by the source follower and are output as a voltage signal from the pixel 1.

At this time, when the ΦCT is raised, the voltage signal output from the pixel 1 is sampled by the signal holding capacitor 31 through the first capacitor writing switch 32. Since the subsequent operations are the same as those of the operations described in FIG. 5, their descriptions are omitted.

Figure 8:
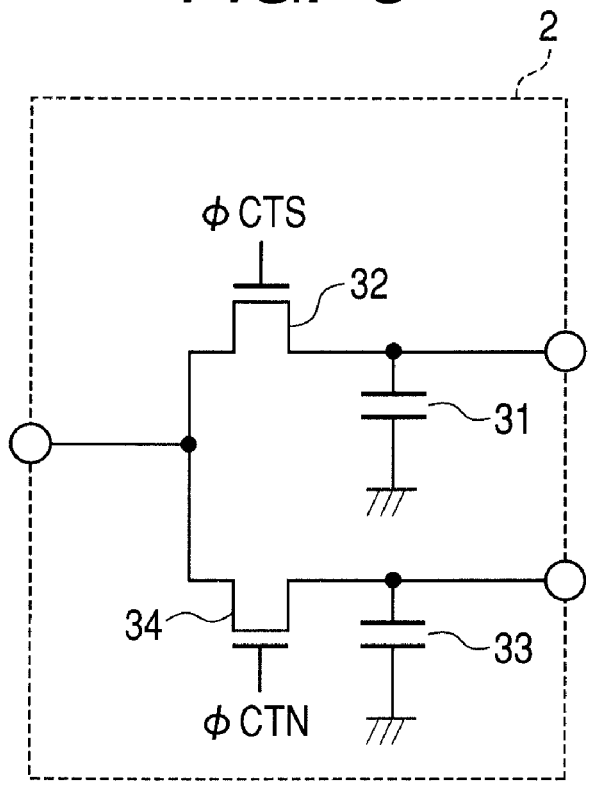
FIG. 8 is a circuit diagram showing another example of the holding unit.

It is also good to use, for example, construction illustrated in FIG. 8 as the holding unit 2. In FIG. 8, the same reference symbols are applied to components common to those in FIG. 3, and their descriptions are omitted. A noise holding capacitor 33 holds a noise component of a pixel and a second capacitor writing switch 34 writes the noise component in the noise holding capacitor 33.

When taking this construction, it is not illustrated here, but two output transfer switches, that is, one for the signal component held by each signal holding capacitor 31, and another for the noise component held by each noise component holding capacitor 33, are needed. Similarly, such construction that two common output lines 12 are made a set is used. Furthermore, each output circuit 13 becomes a differential input circuit, and outputs a signal obtained by multiplying a difference between the signal component output to the common output line, and the noise component by an arbitrary gain.

Figure 9:
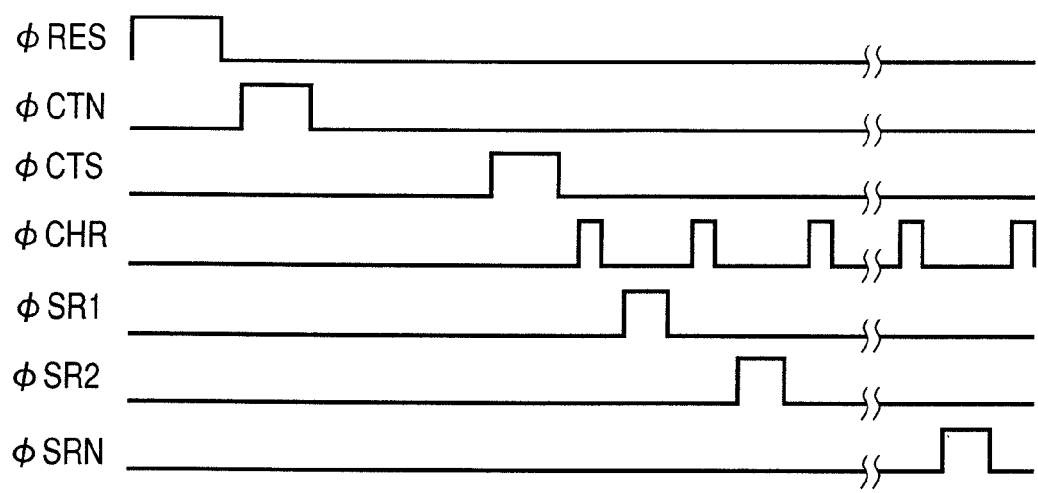
FIG. 9 is a timing chart illustrating an operation in the case of using the holding unit in FIG. 8.

Next, an operation of a solid-state imaging apparatus with the holding unit 2 illustrated in FIG. 8 will be described using FIG. 9. It is assumed that a pixel has construction illustrated in FIG. 2. In FIG. 9, reference symbol ΦCTN denotes a control signal of the second capacitor writing switch 34. While the ΦCTN is High after resetting the photoelectric conversion element 21 with the ΦRES, a reset level of each color pixel is written as a noise component in each noise holding capacitor 33 through the second capacitor writing switch 34 (refer to FIG. 8).

Next, the stored signal of each color component is sampled by the signal holding capacitor 31 through the capacitor writing switch 32 while the ΦCTS is High, and a value at falling of the ΦCTS is held as a signal component.

While the ΦCHR is High, each common output line 12 is reset in the voltage VCHR through the common output line reset transistor 14 (refer to FIG. 1). The ΦSR1 rises after the ΦCHR falls, and the signal of each color component held by each signal holding capacitor 31 through the output transfer switch in the unit cell 10-1 which is a first bit, and the noise component of each color component held by each noise holding capacitor 33 are output to each common output line 12.

The signal component and noise component of each color component which are multiplied by the gain determined by the above-described Formula (1) and are output to the common output line 12 are input into the output circuit 13 to be differenced, and are output from each output terminal after being multiplied by an arbitrary gain. Thus, by using the construction in FIG. 8 as the holding unit 2, the noise component generated in each pixel can be removed to achieve performance in which an S/N ratio is higher.

Since an operation of monochromatic image reading is the same as that described previously, its description is omitted. In addition, the pixel 1 may have the construction illustrated in FIG. 6. In this case, as a noise component, a reset level of the FD unit is held through the source follower in the noise holding capacitor 33, and a differential signal with the signal component is output in the output circuit 13.

Figure 10:
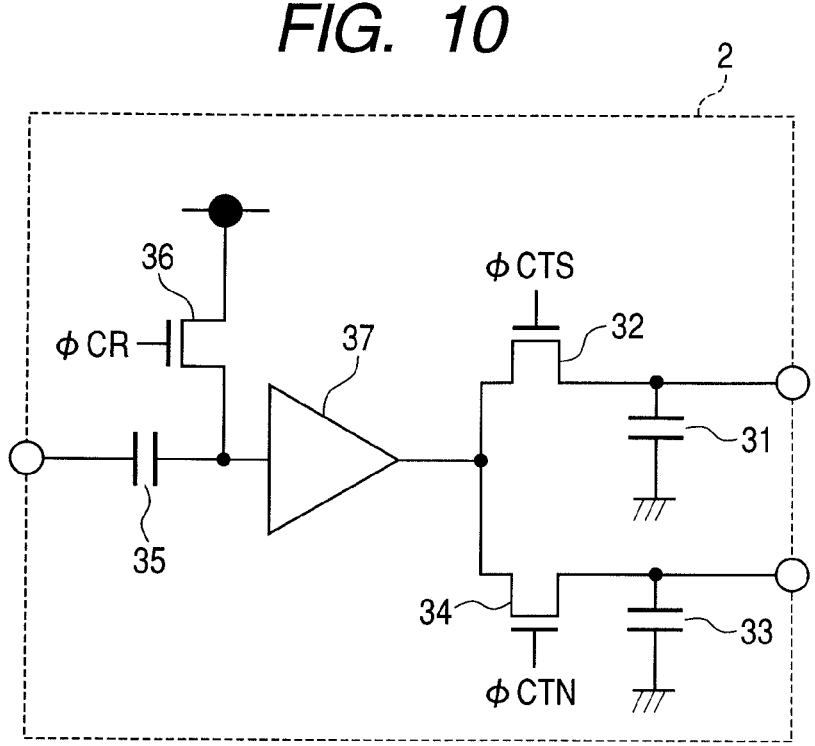
FIG. 10 is a circuit diagram showing still another example of the holding unit.

Furthermore, it is also good to use, for example, construction illustrated in FIG. 10 as the holding unit 2. In FIG. 10, the same reference symbols are applied to components common to those in FIG. 8, and their descriptions are omitted. This figure illustrates a clamp capacitor 35, a clamp switch 36 and a gain amplifier 37.

Figure 11:
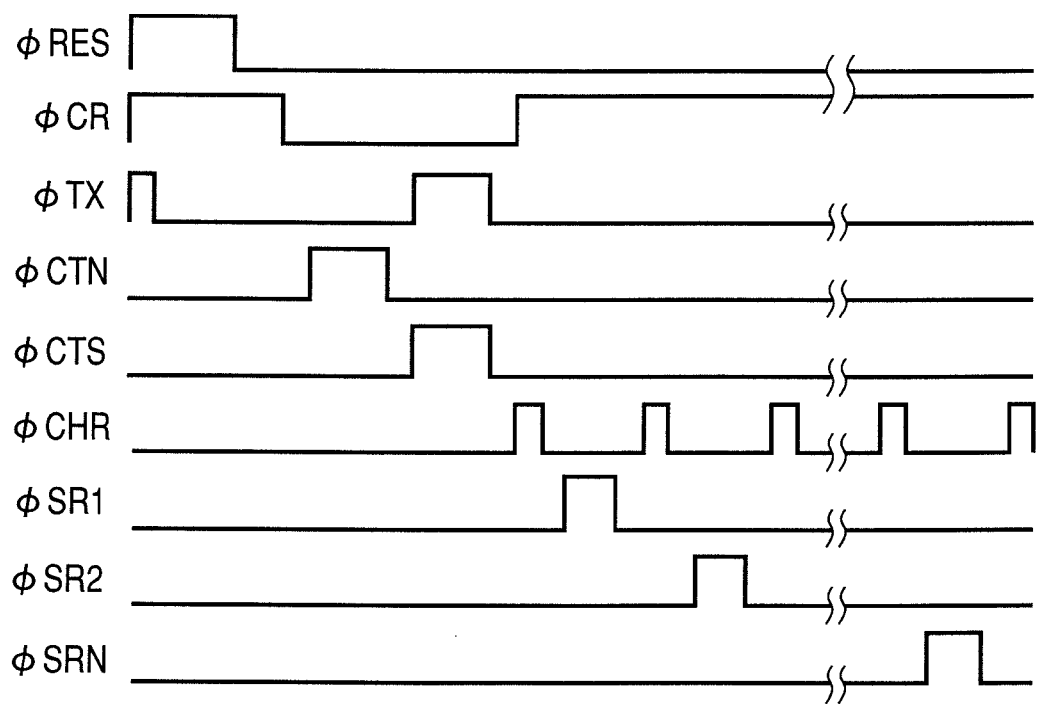
FIG. 11 is a timing chart illustrating an operation in the case of using the holding unit in FIG. 10.

Next, an operation of a solid-state imaging apparatus with the holding unit having the construction illustrated in FIG. 10 will be described using FIG. 11. As the pixel 1, one having the construction in FIG. 6 is used. Reference symbol ΦCR denotes a control signal of the clamp switch 36. The photoelectric conversion element 21 is reset while the ΦRES and ΦTX are High. In addition, the floating diffusion unit is reset while the ΦRES is High.

While the ΦCR is High, a terminal of the clamp capacitor 35 near the gain amplifier 37, and an input terminal of the gain amplifier 37 are fixed to the VCR, and the reset level of the floating diffusion unit is clamped at another terminal of the clamp capacitor 35. Next, the ΦCTN is set to High and an output voltage at the time when the input voltage of the gain amplifier 37 is fixed to the VCR is held in the noise holding capacitor 33.

Next, the signal stored in the photoelectric conversion element 21 is output from the pixel 1 by setting the ΦTX to High. Then, a difference with the reset level of the floating diffusion unit is taken in the clamp capacitor 35, and only a changed portion of the signal component of the pixel 1 is input into the gain amplifier 37 through the clamp capacitor 35. At this time, the signal component through the gain amplifier 37 is held in the signal holding capacitor 31 by setting the ΦCTS to High.

Then, an offset component of the gain amplifier is removable by taking in the output circuit 13 a difference between the signals held in the signal holding capacitor 31 and noise holding capacitor 33. At this time, when one or more of arbitrary gain is applied to the gain amplifier 37, the gain can be applied, without generating an offset, and also performance of a high S/N ratio can be achieved. Since an operation of monochromatic image reading is the same as that described previously, its description is omitted. The pixel 1 may have the construction illustrated in FIG. 2.

In addition, it is also possible to attain power-saving by providing a unit to stop an operation of a source follower circuit of a monochromatic pixel at the time of color image reading. Furthermore, it is also possible to attain power-saving by providing a unit to stop operations of a source follower circuit of a color pixel at the time of monochromatic image reading, a gain amplifier to which a monochromatic pixel is not connected in the case that the gain amplifier is used for a holding unit, an output circuit from which an M component is not output.

Furthermore, since the first selecting unit 15 is inserted only in the common output lines 12-B and 12-M, common output lines 12-R and 12-G of R and G components in which the first selecting units 15 are not inserted differ in capacity values from the common output lines 12-B and 12-M of B and M components. Therefore, the gains of B and M components, and R and G components determined by the Formula (1) may differ, and a difference may be generated for performance, such as an S/N ratio, for every color component.

Figure 12:
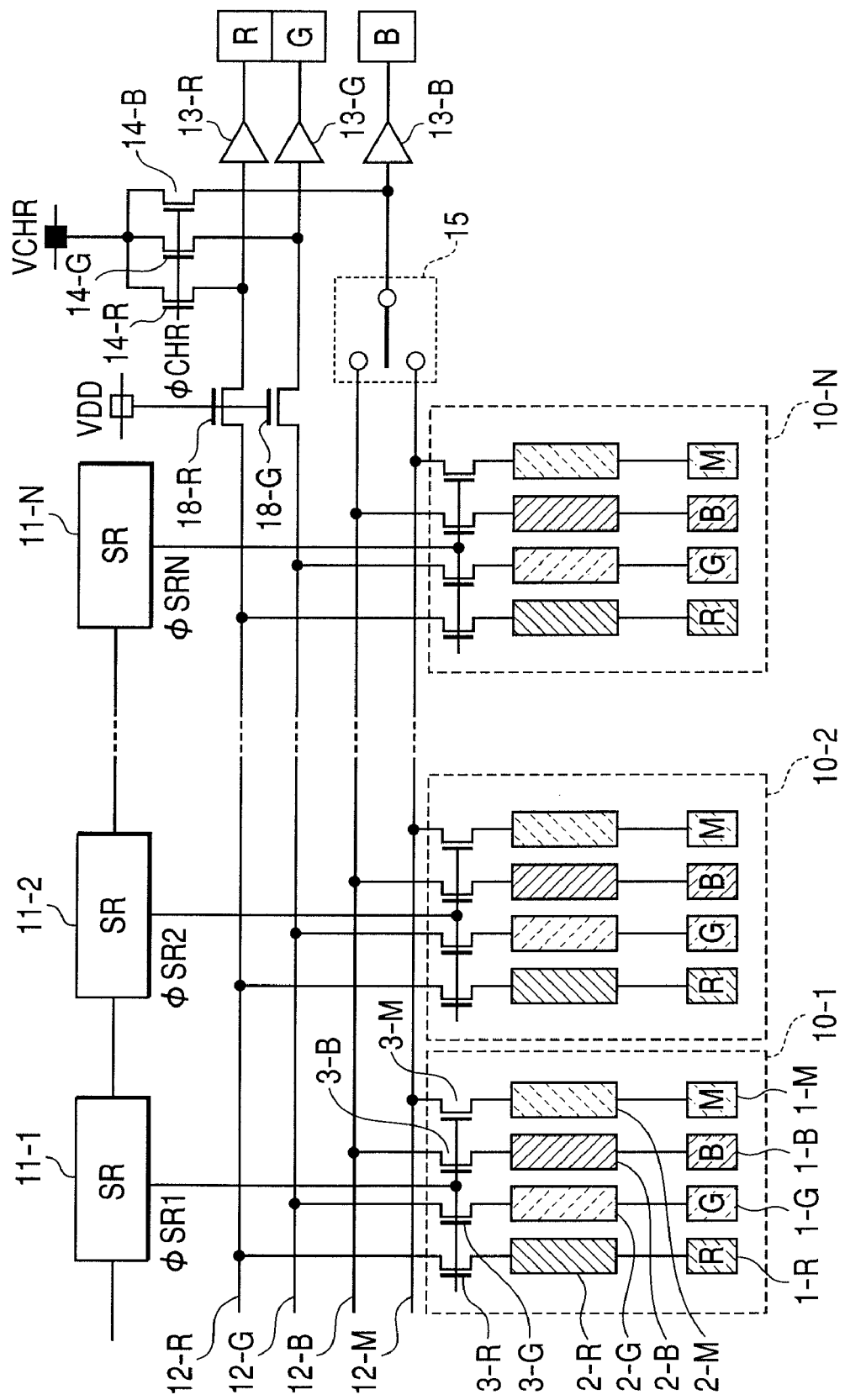
FIG. 12 is a block diagram showing an embodiment of inserting a first dummy transistor in the embodiment of FIG. 1.

In order to avoid this, for example, as shown in FIG. 12, first dummy transistors 18-R and 18-G having the same size and polarity as those of the transistor which constructs the first selecting unit 15 are inserted in the common output lines 12-R and 12-G. In addition, by fixing a gate electrode so that the dummy transistors may be made always into a conduction state, the differences among color components can be removed.

In the example in FIG. 12, NMOS transistors are used for the first selection transistor 16, second selection transistor 17, and first dummy transistor 18, and the VDD which is a supply voltage is applied to the gate electrode of the first dummy transistor 18. FIG. 12 is the same as FIG. 1 except adding the dummy transistors 18.

As described above, the solid-state imaging apparatus according to this embodiment includes a plurality of pixels for reading a plurality of color components, a plurality of holding units for holding a signal from each pixel, and a plurality of common output lines to which the plurality of respective holding units corresponding to respective color components are connected. In addition, it also includes a plurality of output circuits connected to the plurality of common output lines. Then, at least two of the plurality of common output lines are connected to one of the plurality of output circuits through a selecting unit.

In addition, a dummy element having the same construction as an element which constructs a selecting unit is connected between a common output line of a color component and an output circuit where the selecting unit is not connected. Furthermore, a plurality of pixels for reading a plurality of color components is constructed of a plurality of color pixels, which reads a color image, and a monochromatic pixel. Then, a common output line corresponding to a monochromatic pixel and a common output line corresponding to a color pixel of at least one color component among the plurality of color pixels are connected to one output circuit through a selecting unit.

In the first embodiment, respective common output lines of a monochromatic component and one color component among the color components shares the same output circuit using the first selecting unit 15. When doing so, since the number of circuits, that is, the number of circuits which consume electric power is small in comparison with the former with having the functions as the former, low power consumption is realizable, and the solid-state imaging apparatus with a small area is realizable. Furthermore, much more low power consumption is realizable by providing the circuit stop unit mentioned above.

Second Embodiment

Figure 13:
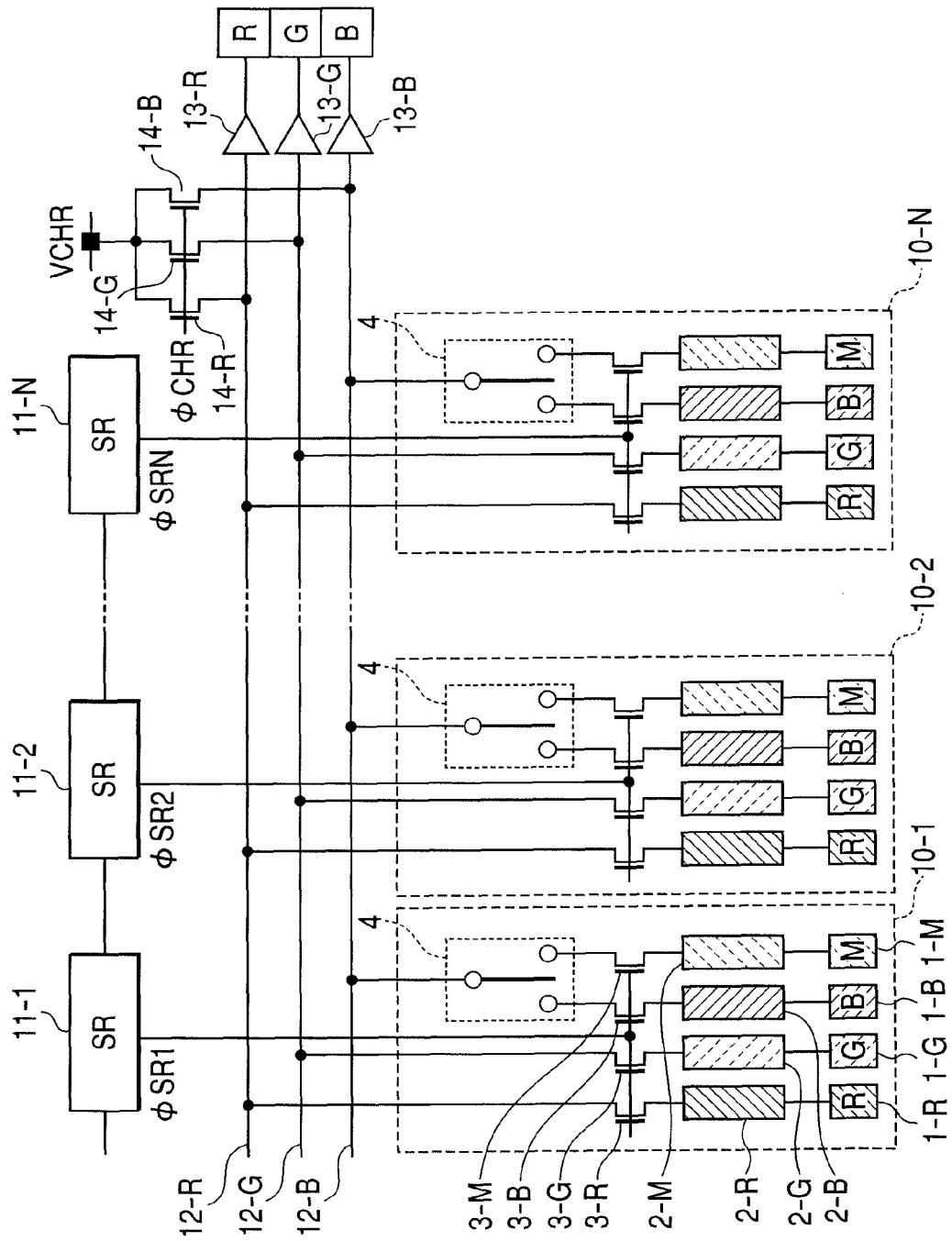
FIG. 13 is a block diagram illustrating a second embodiment of the present invention.

FIG. 13 illustrates a second embodiment of a solid-state imaging apparatus according to the present invention. In FIG. 13, the same reference symbols are applied to the same components in FIG. 1, and their descriptions are omitted. Difference from FIG. 1 is a respect that a selecting unit is provided in each unit cell. Similarly to FIG. 1, FIG. 13 illustrates an N bits×4 line sensor which reads four components, that is, red (R), green (G), blue (B) and monochromatic (M) components.

In FIG. 13, a second selecting unit 4 selects either of an output transfer switch 3-B of a B component and an output transfer switch 3-M of an M component, and connects it to the common output line 12-B, and is in each unit cell 10. Although the B component and M component share the common output line 12-B and output circuit 13-B in FIG. 13, the B component may be another color component (R or G). Here, let the pixel 1 have, for example, the construction illustrated in FIGS. 2, 5, and the like. Let the holding unit 2 have, for example, the construction illustrated in FIGS. 3, 7, 9, and the like. Furthermore, let the second selecting unit 4 have the construction in FIG. 4.

An operation will be described as follows. As an example, a case that the pixel 1 has the construction in FIG. 2 and the holding unit 2 has that in FIG. 3 will be described. In addition, let the second selecting unit 4 select the output transfer switch 3-B of the B component at the time of color image reading or select the output transfer switch 3-M of the M component at the time of monochromatic image reading, which is connected to the common output line 12-B. Since an operation timing chart is the same as that in FIG. 5, detailed description will be omitted.

At the time of color image reading, each holding unit 2 holds a signal of each component of R, G and B. Since the second selecting unit 4 selects the output transfer switch 3-B of the B component as mentioned above, a signal held in the holding unit 2-B of the B component is output to the common output line 12-B in an output of each unit cell. Similarly, signals held in the holding capacitors of R and G components respectively are output to the common output lines 12-R and 12-G respectively. From each output circuit 13, a signal of each color component of R, G and B is output with arbitrary gains being applied.

On the other hand, since the second selecting unit 4 selects the output transfer switch 3-M of the M component at the time of monochromatic image reading, a signal held in the holding unit 2-M of the M component is output to the common output line 12-B in an output of each unit cell.

Figure 14:
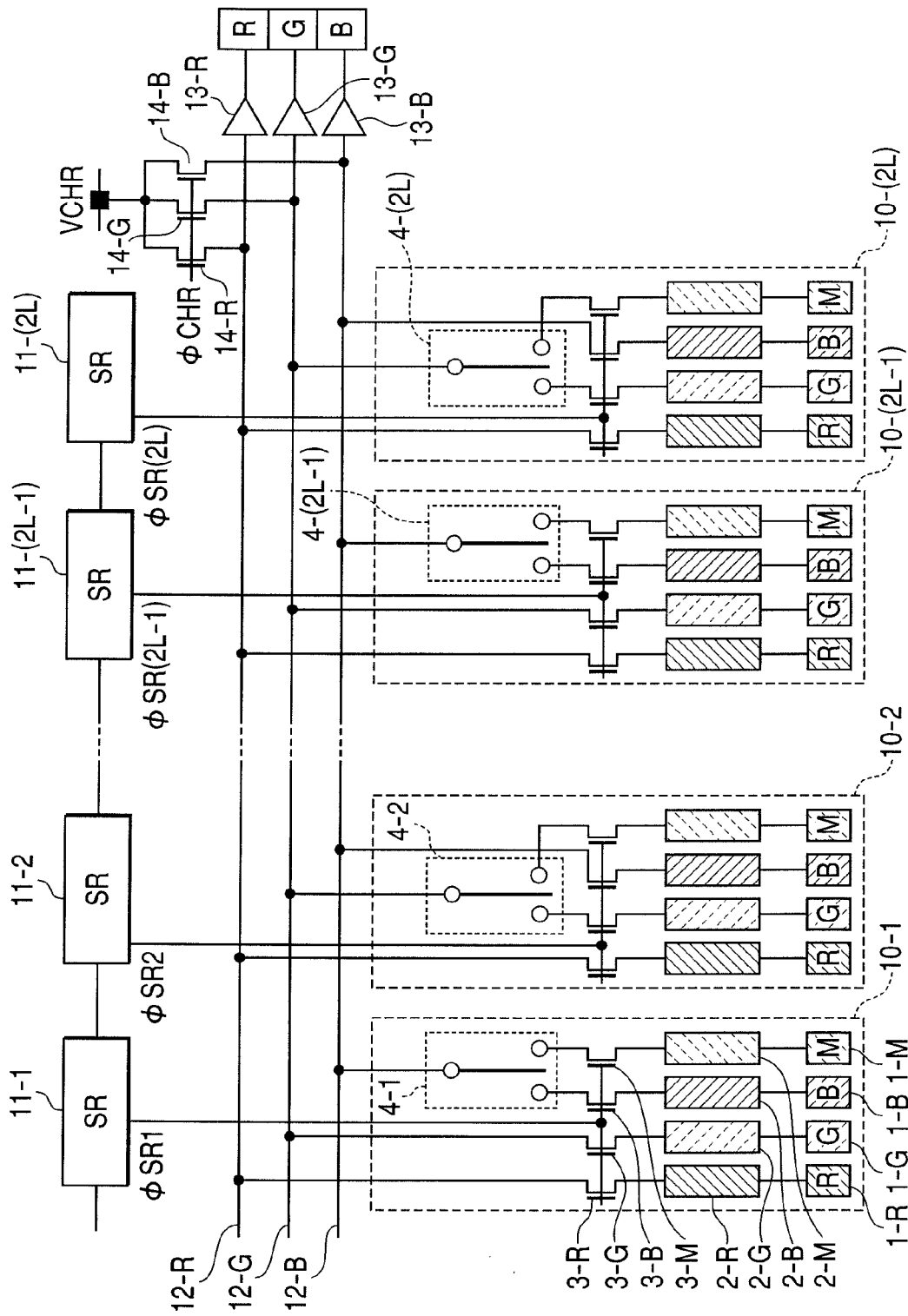
FIG. 14 is a block diagram illustrating an embodiment of performing a parallel output from an output circuit in FIG. 13 at the time of monochromatic image reading.

FIG. 14 illustrates another embodiment. In FIG. 14, the same reference symbols are applied to the same components in FIG. 13. In this construction, an odd-bit unit cell 10—(2L−1) (L is an integer of 1 to N/2) has such construction that a second selecting unit 4—(2L−1) selects either of the output transfer switches 3-B and 3-M similarly to FIG. 13. On the other hand, an even-bit unit cell 10—(2L) has such construction that a second selecting unit 4—(2L) selects either of the output transfer switches 3-G and 3-M.

In the case of this construction, since signals are output from two output circuits 13-B and 13-G in parallel at the time of monochromatic image reading, reading can be performed at two times of speed in comparison with a case of color image reading. In FIG. 14, although a B component in an odd bit, and a G component and an M component in an even bit share an output circuit, it does not matter whether even and odd bits are reverse or combination of sharing color components is (R, G) or (R, B).

Next, an operation of the solid-state imaging apparatus in FIG. 14 will be described. Here, at the time of color image reading, a second selecting unit 4—(2L−1) in an odd bit selects an output transfer switch 3-B of a B component. In addition, let a second selecting unit 4—(2L) in an even bit select an output transfer switch 3-G of a G component, and connect it with the common output line 12-B. Furthermore, at the time of monochromatic image reading, let it select an output transfer switch 3-M of an M component and connect them with the common output lines 12-B and 12-G respectively. Since the subsequent operations are the same as those of the operations described in FIGS. 5, 9 and 11, their descriptions are omitted.

Figure 15:
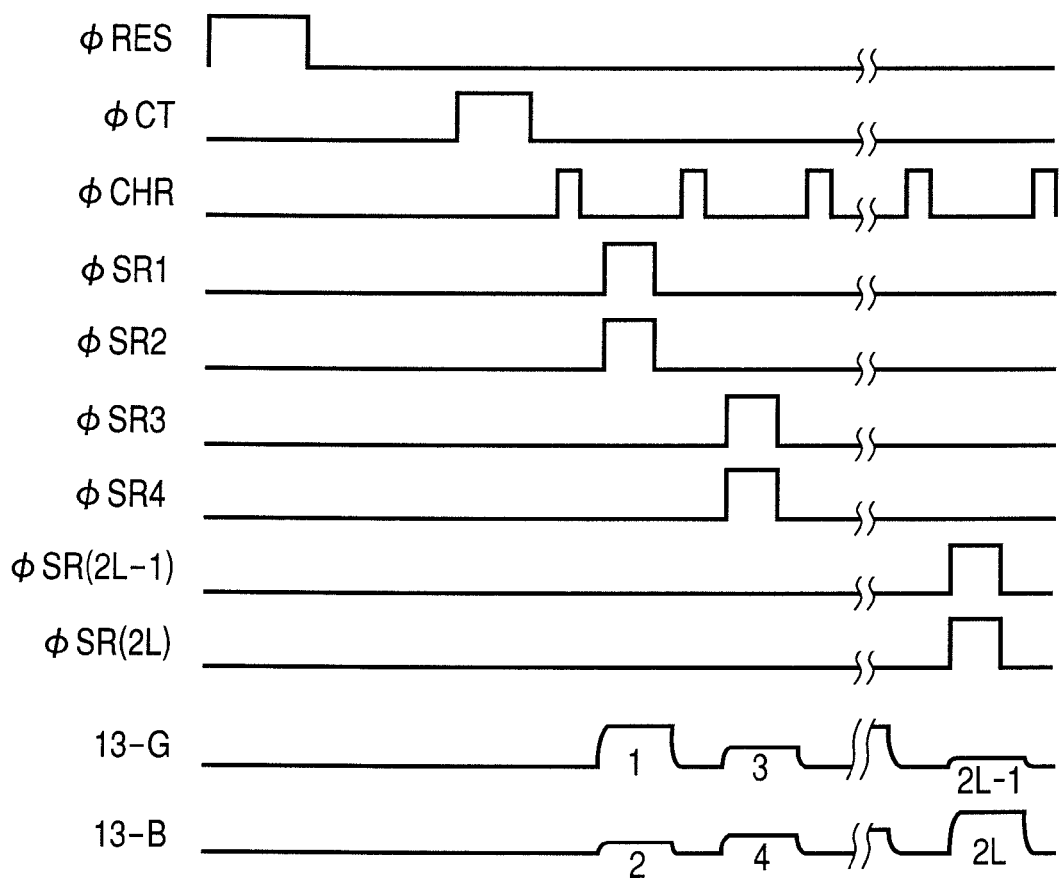
FIG. 15 is a timing chart illustrating an operation at the time of monochromatic image reading in the embodiment of FIG. 14.

An operation at the time of monochromatic image reading will be described using FIG. 15. As illustrated in FIG. 15, 2 bits ΦSR1 and ΦSR2, and ΦSR3 and ΦSR4) of each output of a shift register 11 are output simultaneously at the time of monochromatic image reading. By doing so, signals are output in parallel from two output circuits 13-G and 13-B through two common output lines 12-G and 12-B. Although 2 parallel outputs are described here, it is also possible to adopt 3 parallel output construction in the same way of thinking at the time of monochromatic image reading.

In addition, it is also possible to attain power-saving by providing a unit to stop an operation of a source follower circuit of a monochromatic pixel at the time of color image reading. Furthermore, it is also possible to attain power-saving by providing a unit to stop operations of a source follower circuit of a color pixel at the time of monochromatic image reading, a gain amplifier to which a monochromatic pixel is not connected in the case that the gain amplifier is used for a holding unit, an output circuit from which an M component is not output.

Moreover, since the second selecting unit 4 is inserted only in the B and M components in the construction in FIG. 13, common output lines 12-R and 12-G of R and G components in which the second selecting units 4 are not inserted differ in parasitic capacitance from the common output lines 12-B and 12-M of B and M components. Therefore, the gains of B and M components, and R and G components determined by the Formula (1) may differ, and a difference may be generated for performance, such as an S/N ratio, for every color component.

In order to avoid this, similarly to the construction in FIG. 12, each second dummy transistor having the same size and polarity as those of the transistor which constructs the second selecting unit 4 is inserted between output transfer switches 3-R and 3-G of R and G components in each unit cell 10, and the common output lines 12-R and 12-G. Then, it is no matter to remove the differences among color components by fixing a gate electrode so that the dummy transistors may be made always into a conduction state.

Figure 16:
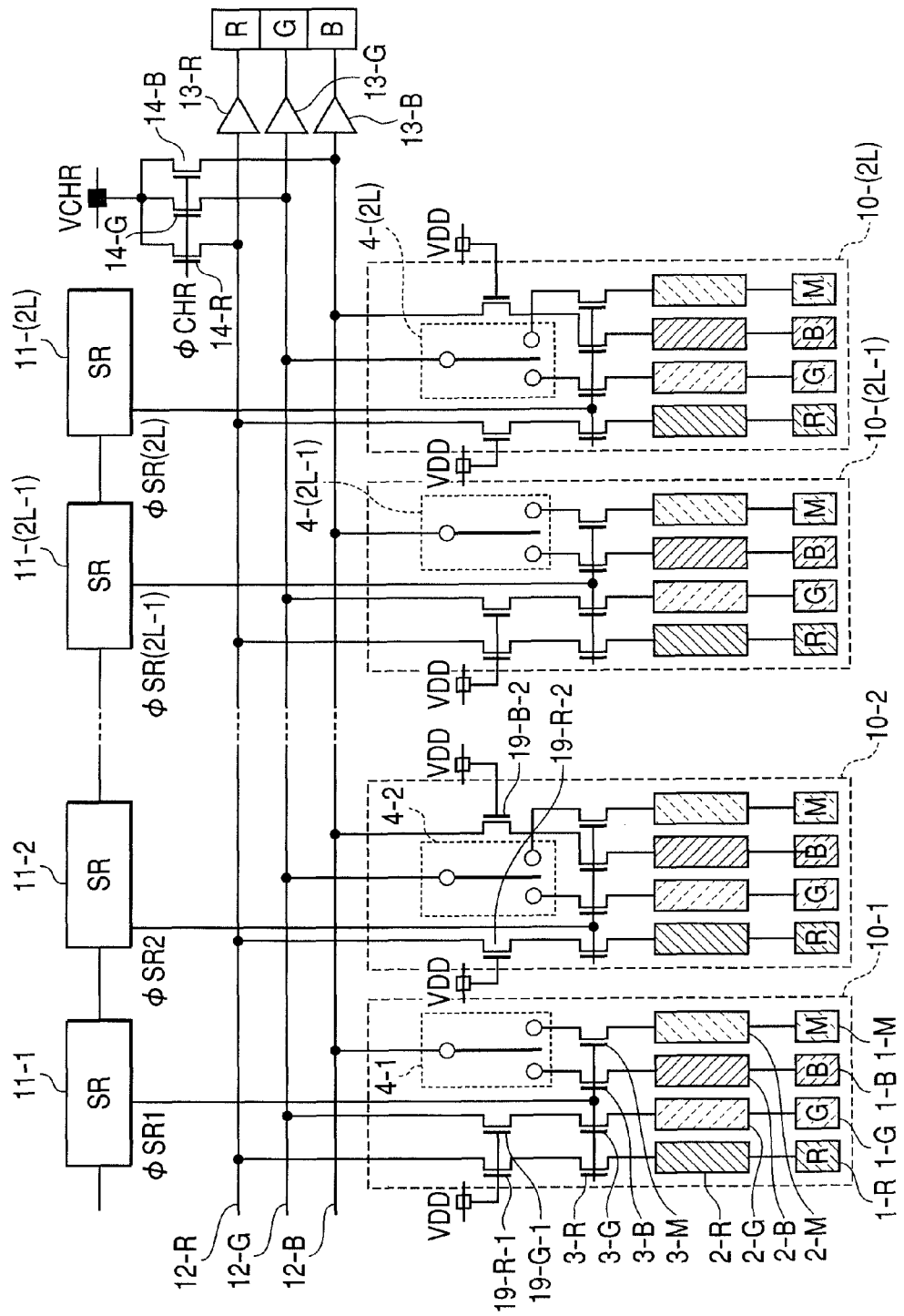
FIG. 16 is a block diagram illustrating an embodiment of inserting a second dummy transistor in the embodiment of FIG. 13.

In addition, also in the construction in FIG. 14, as illustrated in FIG. 16, what is necessary is just to insert a second dummy transistor 19 into a node between an output transfer switch 3 and a common output line 12 in which a second selecting unit 4 is not inserted. In FIG. 16, for example, in the unit cell 10-1, a second dummy transistor 19-R-1 is inserted between an output transfer switch 3-R and a common output line 12-R, a dummy transistor 19-G-1 is connected between an output transfer switch 3-G and the common output line 12-G. Similarly, let the second dummy transistor 19 be a transistor having the same size and polarity as the transistor which constructs the second selecting unit 4. FIG. 16 is the same as FIG. 14 except providing the second dummy transistors 19.

Furthermore, in this example, although the second selecting unit 4 is arranged between the output transfer switch 3 and common output line 12, it is sufficient to arrange it between the holding unit 2 and output transfer switch 3. In this case, what is necessary is just to insert also the second dummy transistor 19 between the holding unit 2 and output transfer switch 3 similarly.

As described above, the solid-state imaging apparatus according to this embodiment includes a plurality of unit cells each having a plurality of pixels for reading a plurality of color components, and a plurality of holding units for holding each signal from the plurality of pixels. In addition, it includes a plurality of common output lines to which outputs of the plurality of holding units corresponding to respective color components of the plurality of unit cells are connected, and a plurality of output circuits connected to the plurality of common output lines, respectively. Then, outputs of holding units to which pixels of at least two different color components among the plurality of pixels in each unit cell are connected are connected to one of the common output lines through a selecting unit.

In addition, a dummy element having the same construction as an element which constructs a selecting unit is connected between a holding unit of a color component, where the selecting unit is not connected, and a common output line. Furthermore, a plurality of pixels of each unit cell for reading a plurality of color components is constructed of a plurality of color pixels, which reads a color image, and a monochromatic pixel. Then, an output of a holding unit to which a monochromatic pixel is connected and an output of a holding unit to which a color pixel of at least one color component among the plurality of color pixels are connected to one common output line through a selecting unit.

In the second embodiment, the same common output line and output circuit are shared by holding units of an M component and at least one color component among color components, and an output transfer switch using a second selecting unit. When doing so, since the number of circuits, that is, the number of circuits which consume electric power is small in comparison with the first embodiment with having the functions as the former, the solid-state imaging apparatus with lower power consumption and a smaller area than those of the first embodiment is realizable. Furthermore, much more low power consumption is realizable by providing the circuit stop unit mentioned above.

Third Embodiment

Figure 17:
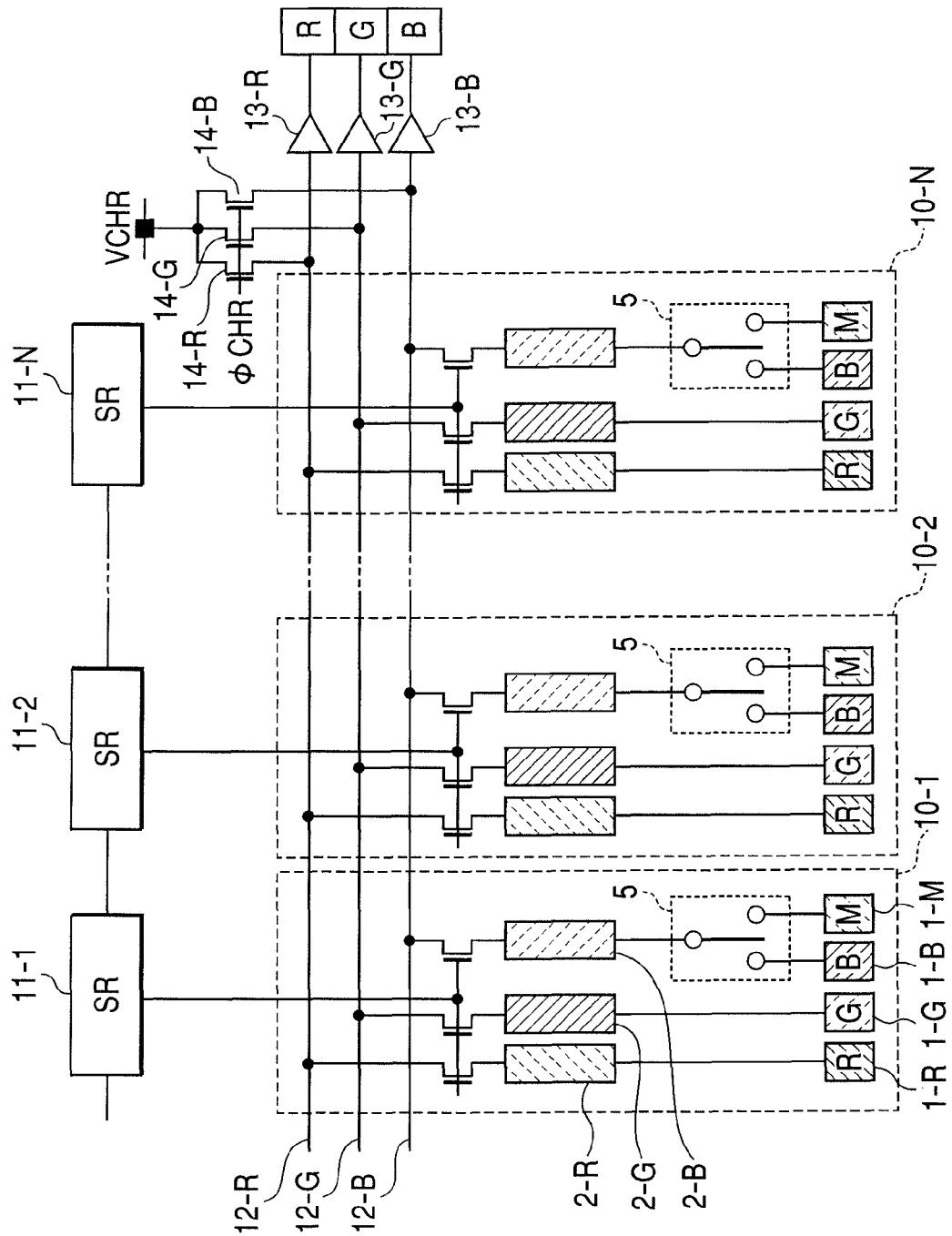
FIG. 17 is a block diagram illustrating a third embodiment of the present invention.

FIG. 17 illustrates a third embodiment of the present invention. In FIG. 17, the same reference symbols are applied to the same components in FIG. 1, 13 and the like, and their descriptions are omitted. Similarly to FIG. 1, FIG. 17 illustrates an N bits×4 line sensor which reads four components, that is, red (R), green (G), blue (B) and monochromatic (M) components. In FIG. 17, a third selecting unit 5 selects either of a pixel 1-B of a B component and a pixel 1-M of an M component, and connects it to a holding unit 2-B, and is in each unit cell 10.

Although the B component and M component share the holding unit 2-B, common output line 12-B, and output circuit 13-B in FIG. 17, the B component may be another color component (R or G). Here, let the pixel 1 have, for example, the construction illustrated in FIGS. 2, 5, and the like. What is illustrated, for example, in FIGS. 3, 8, 10, or the like is used for the holding unit 2. Furthermore, let the third selecting unit 5 have the construction in FIG. 4.

Its operation is the same as that of the case in FIG. 13 fundamentally. In the embodiment in FIG. 13, let the second selecting unit 4 select the output transfer switch 3-B of the B component at the time of color image reading or select the output transfer switch 3-M of the M component at the time of monochromatic image reading, which is connected to the common output line 12-B. This embodiment is different in a respect that the third selecting unit 5 selects the pixel 1-B of the B component at the time of color image reading or selects the pixel 1-M of the M component at the time of monochromatic image reading, which is connected to the holding unit 2-B. In addition, similarly to FIG. 14 and FIG. 16, it is also possible to make two or three outputs at the time of monochromatic image reading parallel also in this embodiment.

In addition, similarly, it is also good to provide a unit to stop an operation of a source follower circuit of a monochromatic pixel at the time of color image reading. Furthermore, it is also good to provide a unit to stop operations of a source follower circuit of a color pixel at the time of monochromatic image reading, a gain amplifier to which a monochromatic pixel is not connected in the case that the gain amplifier is used for a holding unit, and an output circuit from which an M component is not output.

Moreover, since the third selecting unit 5 is inserted only in the B and M components, pixel outputs of R and G components in which the third selecting units 5 are not inserted differ in parasitic capacitance and parasitic resistance from pixel outputs of B and M components. For this reason, since time constants of pixel output waveforms of respective color components differ, differences among color components arise in timing margins for holding a noise component depending on a signal component and construction in the holding unit 2, and hence, gains of respective color components may differ. In addition, offsets different every color component may be overlapped on a pixel output of every color component.

In order to avoid this, by a way of thinking similarly to the construction in FIG. 12, a third dummy transistor having the same size and polarity as the transistor which constructs the third selecting unit 5 is inserted between pixels 1-R and 1-G of R and G components, and holding units 2-R and 2-G in each unit cell 10. Then, it is sufficient to remove the differences among color components by fixing a gate electrode so that the dummy transistor may be made always into a conduction state.

In addition, in the case of construction of outputting an M component in two- or three-parallel, by a way of thinking similarly to the construction in FIG. 16, what is necessary is just to insert a third dummy transistor in a node between the pixel 1 and holding unit 2 in which the third selecting unit 5 is not inserted.

As described above, the solid-state imaging apparatus according to this embodiment includes a plurality of unit cells each having a plurality of pixels for reading a plurality of color components, and a plurality of holding units holding each signal from the plurality of pixels. In addition, it includes a plurality of common output lines to which outputs of the plurality of holding units corresponding to respective color components of the plurality of unit cells are connected, and a plurality of output circuits connected to the plurality of common output lines, respectively. Then, pixels of at least two different color components among the plurality of pixels in each unit cell are connected to one holding unit through a selecting unit.

In addition, a dummy element having the same construction as an element which constructs a selecting unit is connected between a pixel of a color component, where the selecting unit is not connected, and a holding unit. Furthermore, a plurality of pixels of each unit cell for reading a plurality of color components is constructed of a plurality of color pixels, which reads a color image, and a monochromatic pixel. Then, the monochromatic pixel and a color pixel of at least one color component among the plurality of pixels are connected to one holding unit through a selecting unit.

In the third embodiment, the same holding unit, common output line, and output circuit are shared by pixels of an M component and at least one color component among color components using a third selecting unit. When doing so, since the number of circuits, that is, the number of circuits which consume electric power is small in comparison with the first and second embodiments with having the functions as the former, the solid-state imaging apparatus with lower power consumption and a smaller area than those of the first and second embodiments is realizable. Furthermore, much more low power consumption is realizable by providing the circuit stop unit mentioned above.

Fourth Embodiment

Figure 18:
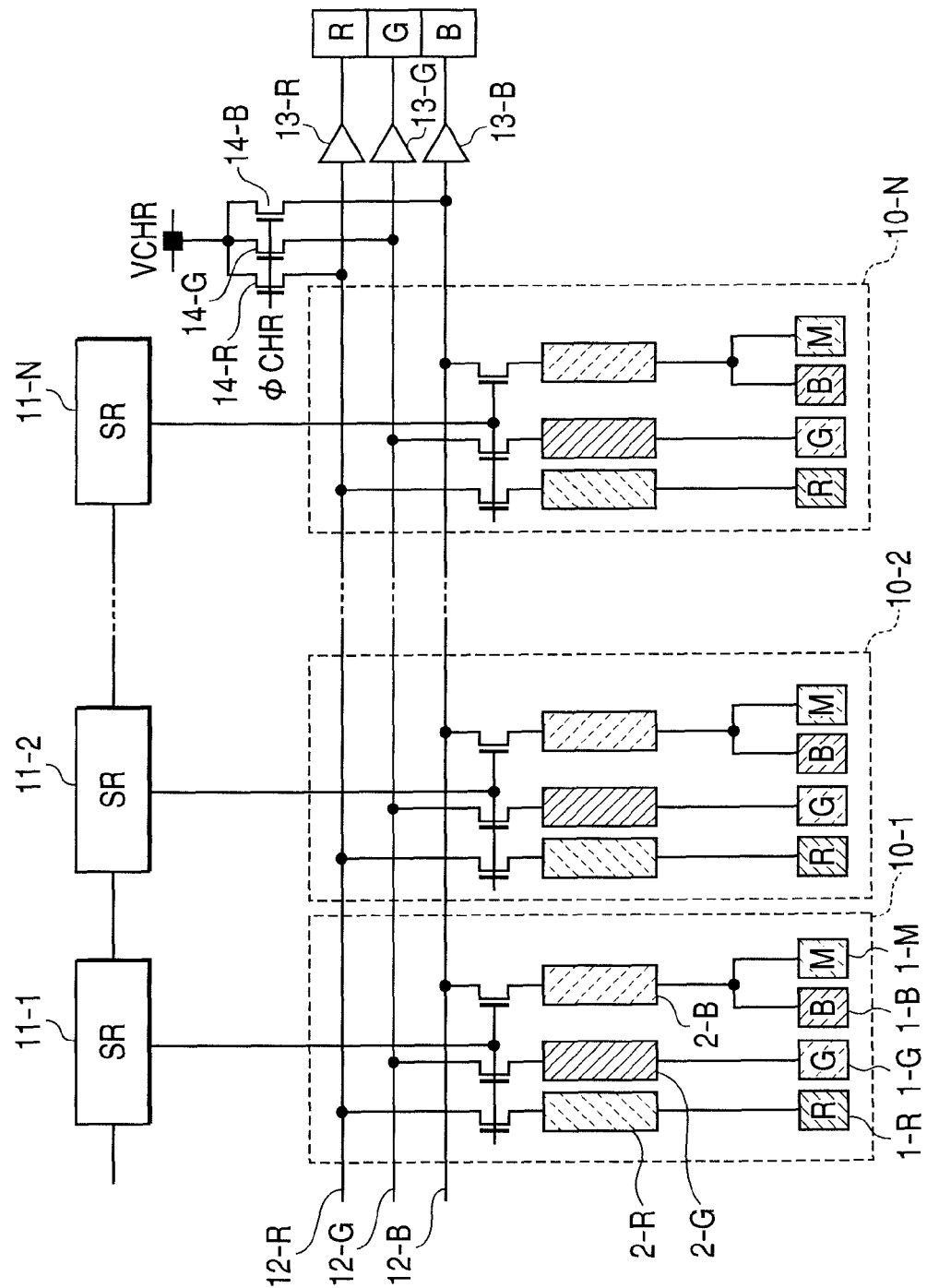
FIG. 18 is a block diagram illustrating a fourth embodiment of the present invention.

FIG. 18 illustrates construction of a fourth embodiment of the present invention. Similarly to FIG. 17, FIG. 18 illustrates an N bits×4 line sensor which reads four components, that is, red (R), green (G), blue (B) and monochromatic (M) components. In FIG. 18, the same reference symbols are applied to components common to those in FIG. 17, and their descriptions are omitted. FIG. 18 illustrates an example of sharing the same holding unit 2-B between the pixel 1-B of a B component and the pixel 1-M of an M component. Of course, the B component may be another color component (R or G).

Figure 19:
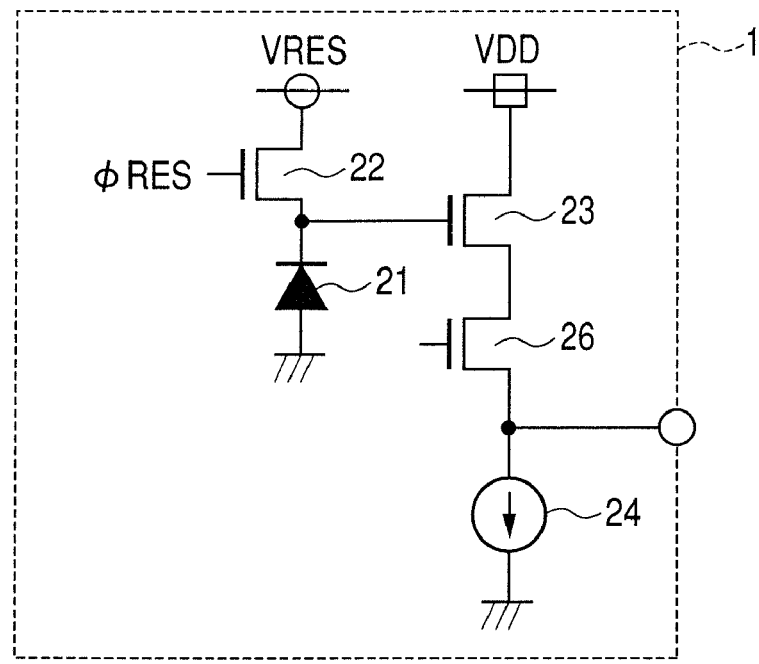
FIG. 19 is a circuit diagram illustrating an example of a pixel used in the embodiment of FIG. 18.
Figure 20:
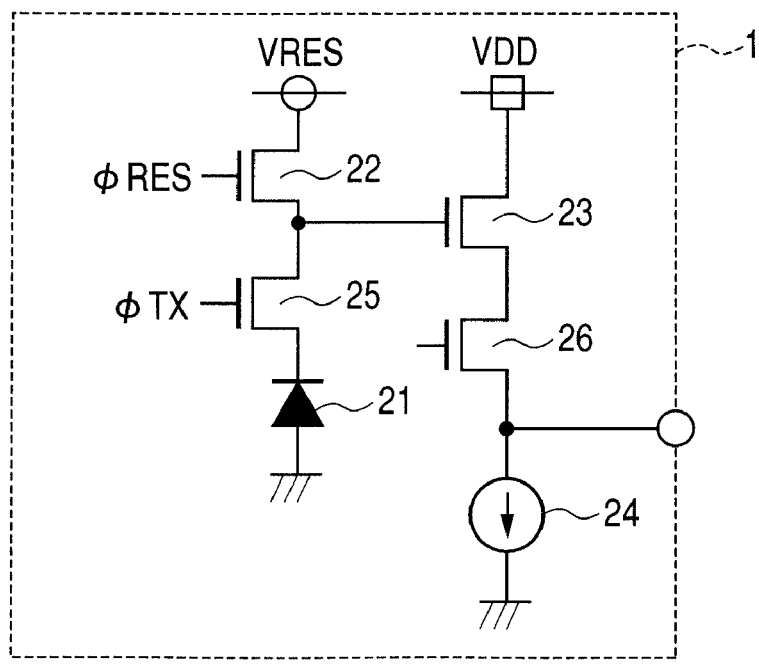
FIG. 20 is a circuit diagram illustrating another example of the pixel used in the embodiment of FIG. 18.

FIG. 19 illustrates an example of a pixel used in this embodiment. A switching transistor 26 is newly added to the construction in FIG. 2, and is connected to a source electrode of a source follower input transistor 23. The pixel 1 may have construction illustrated in FIG. 20. In FIG. 20, the transfer transistor 25 is added like FIG. 6. In this example, although the switching transistor 26 is described as an NMOS transistor, it may be a PMOS or CMOS transistor. Let the holding unit 2 have, for example, the construction illustrated in FIGS. 3, 8, 10, and the like.

An operation will be described as follows. At the time of color image reading, by making a gate electrode of each switching transistor 26 of pixels 1-R, 1-G and 1-B of R, G and B components be in a High level, the each switching transistor 26 is made into a conduction state. At the same time, by making a gate electrode of the switching transistor 26 of a pixel 1-M of an M component be in a Low level, the switching transistor 26 is made into a non-conduction state.

When performing the same operation as the description in FIG. 17 in this state, it is possible to output each component of R, G and B, and to achieve power-saving by stopping the operation of the source follower circuit of the M component.

Similarly, at the time of monochromatic image reading, by making a gate electrode of each switching transistor 26 of pixels 1-R, 1-G and 1-B of R, G and B components be in a Low level, the each switching transistor 26 is made into a non-conduction state. At the same time, by making the gate electrode of the switching transistor 26 of the pixel 1-M of an M component be in a High level, the switching transistor 26 is made into a conduction state. In this state, only the M component is output, it is possible to achieve power-saving by stopping operations and currents of the source follower circuits of R, G and B components.

In FIG. 18, although the same holding unit 2-B is shared by the pixel 1-B of a B component and the pixel 1-M of an M component, similarly to FIG. 14 and FIG. 16, it is also possible to output signals in two- or three-parallel at the time of monochromatic image reading. In this case, an operation and a current of a source follower circuit of a pixel which does not share the holding unit 2 with the pixel of the M component are stopped.

As described above, the solid-state imaging apparatus according to this embodiment includes a plurality of unit cells each having a plurality of pixels for reading different color components, and a plurality of holding units for holding signals from the plurality of pixels. In addition, it includes a plurality of common output lines to which outputs of the plurality of holding units corresponding to respective color components of the plurality of unit cells are connected, and a plurality of output circuits connected to the plurality of common output lines, respectively.

Then, it has in a pixel a switching transistor for switching whether a signal of the pixel is output or not, and pixels of at least two different color components among the plurality of pixels in each unit cell are connected to one holding unit. In addition, it switches outputs of signals of pixels by controlling a switching transistor between the at least two pixels of different color components. Furthermore, a plurality of pixels of each unit cell for reading a plurality of color components is constructed of a plurality of color pixels, which reads a color image, and a monochromatic pixel. Then, the monochromatic pixel and a color pixel of at least one color component among the plurality of pixels are connected to one holding unit.

Generally, a pixel pitch and aperture size of a solid-state imaging apparatus tend to narrowing the pitch and lessening the aperture. In such a trend, it is necessary to reserve spaces for arranging circuit elements which are a holding unit, a gain amplifier, and the like which are described up to now, and are needed for every pixel. Therefore, for example, as disclosed in Japanese Patent Application Laid-Open No. 2003-259227, a method of dividing and arranging pixel columns in two, that is, up and down directions has been adopted increasingly (refer to FIG. 1 in Japanese Patent Application Laid-Open No. 2003-259227).

Figure 21:
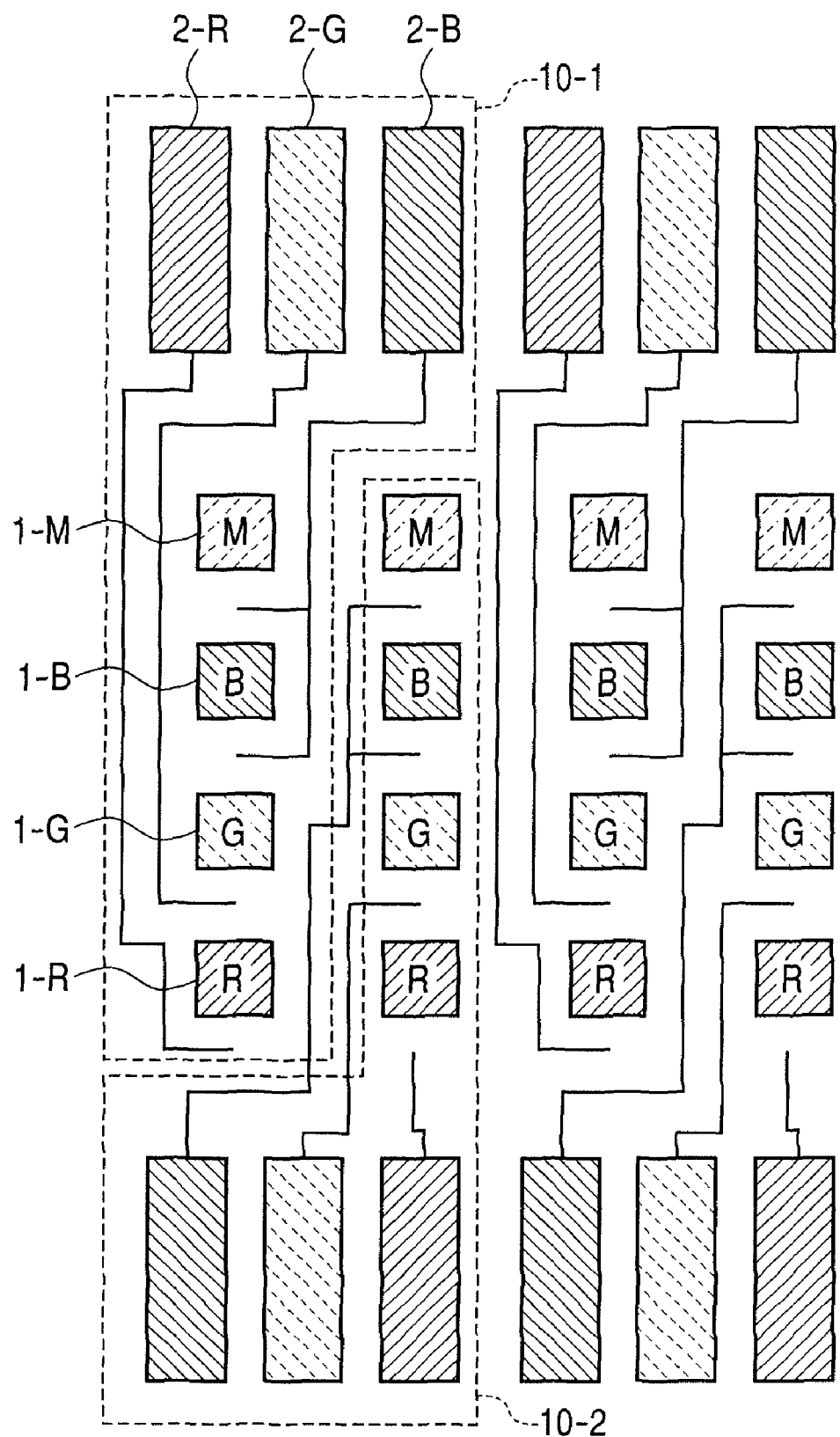
FIG. 21 is a drawing illustrating an example of dividing and arranging each holding unit in two, that is, up-and-down directions of a pixel in the embodiment of FIG. 18.

FIG. 21 illustrates an example of arranging the pixels 1 of respective color components of R, G, B and M in a column manner, and dividing and arranging the holding units 2 in two, that is, up and down directions of the pixel column, in the solid-state imaging apparatus illustrated in FIG. 18. A holding unit is shared by pixels of a B component and an M component like FIG. 18. An output line is wired through between pixels from under each pixel 1, and is connected to each holding unit 2. In addition, a holding unit in one unit cell is altogether arranged in the same side to a pixel column, and a holding unit of an adjacent unit cell is arranged in a reverse side to the pixel column.

Thus, in the solid-state imaging apparatus in FIG. 21, a plurality of unit cells in which a plurality of pixels are arranged in a column manner for every color component is arranged orthogonally to the line direction of pixels of the unit cell concerned, and a plurality of holding units of the same unit cell is arranged in one direction side to the pixel columns of the plurality of unit cells. In addition, a plurality of holding units of a unit cell adjacent to the unit cell is arranged in another direction side to the pixel columns of the plurality of unit cells.

In addition, pixels of at least two color components of a unit cell are connected to the same holding unit, and pixels of at least two color components connected to the same holding unit are arranged adjacently in the line direction of the unit cell.

Figure 22:
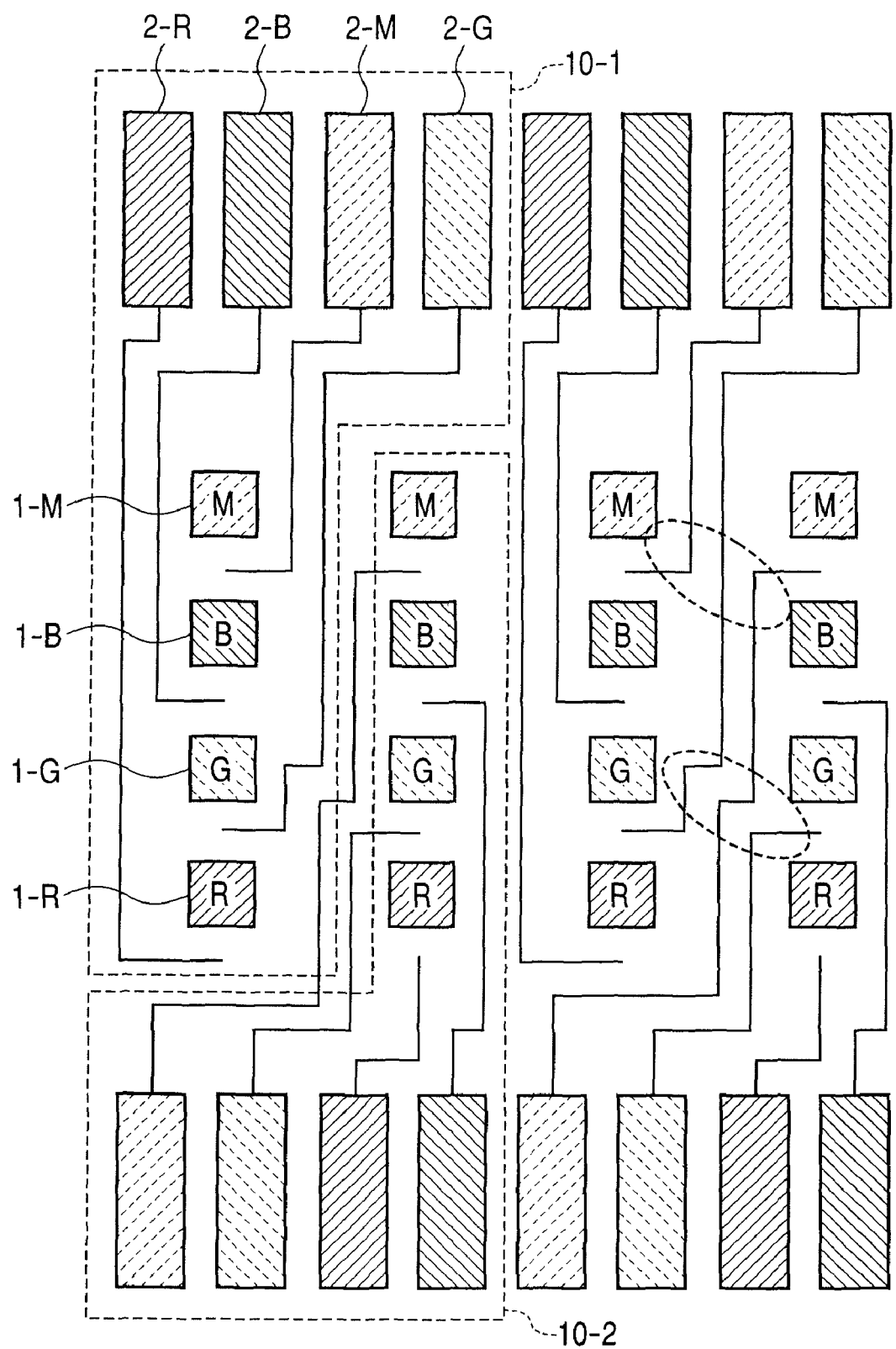
FIG. 22 is a drawing illustrating an example of arrangement of the pixels and holding units in the first to third embodiments.

FIG. 22 illustrates an example of arrangement of pixels and holding units at the time when a holding unit is not shared by pixels of different color components (e.g., the first to third embodiments, and the conventional example illustrated in FIG. 2 of Japanese Patent Application Laid-Open No. 2006-211363). Apparently from FIG. 22, it turns out that the number of the output lines which pass between pixels is more than that of the construction in FIG. 21. Hence, when FIG. 21 and FIG. 22 are constructed in the same pixel pitch specification, the construction in FIG. 21 can reserve an aperture of a pixel in a lateral direction more widely.

Since the number of circuit elements of a pixel itself becomes large by adding the switching transistor 26 in the case of FIG. 21, it is conceivable to suppress a pixel aperture by the amount. However, in the case of a solid-state imaging apparatus used in a copier or the like, the pixel pitch specification (it is also called a line interval) in a subscanning direction (longitudinal direction in FIG. 21) is two or more pixel pitches (two lines or more) in many cases.

Therefore, if the added switching transistor 26 is in this space, it is easy to arrange it without reducing a pixel aperture area. In consequence, since there are few output wires which pass between pixels in the construction in FIG. 21, it is possible to take a larger pixel aperture and to reserve higher sensitivity.

Figure 23:
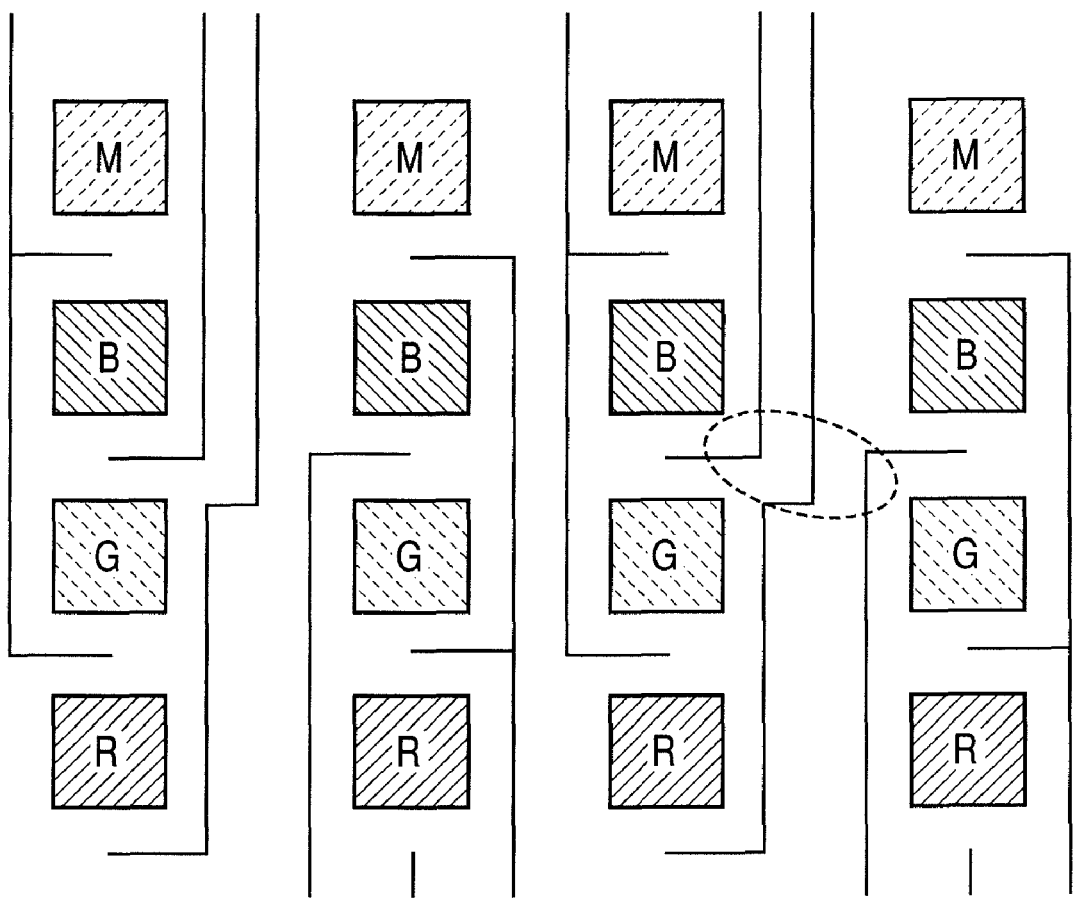
FIG. 23 is a drawing illustrating an undesirable example of arrangement in the fourth embodiments.

FIG. 23 illustrates an example of arrangement that a pixel which shares a holding unit with a monochromatic pixel is exchanged against FIG. 21. A holding unit is omitted. As illustrated in FIG. 23, when two pixel columns which share a holding unit do not adjoin each other up and down, a location where output lines crowd in comparison with FIG. 21 arises, and hence, there is a possibility of suppressing an aperture area. Hence, when a holding unit is always shared between the same color components (when not performing a parallel output at the time of monochromatic image reading), it is desirable that pixel columns of the two color components adjoin each other in a vertical direction.

In addition, when a two-parallel output is performed at the time of monochromatic image reading, it is impossible to make pixels which share a holding unit adjoin each other in the vertical direction in full bits (unit cell). At that time, it is desirable to suppress to the minimum the location where output lines crowd by making at least one color component adjoin a monochromatic pixel.

In the fourth embodiment, the same holding unit, common output line, and output circuit are shared by pixels of an M component and at least one color component among color components using a switching transistor arranged in a pixel. By doing so, it is possible to achieve a solid-state imaging apparatus with lower consumption power and a smaller area than those of the first and second embodiments and with having the functions as the former.

In addition, an area of an adjacent space, where a holding unit and the like are arranged, can be further reduced in comparison with the third embodiment by providing a switching transistor in a pixel. Furthermore, since the number of output lines passing through between pixels is reducible, it is possible to take a large aperture area of a pixel and to achieve higher sensitivity in comparison with those of the first to third embodiments.

Furthermore, all the above-mentioned embodiments are only what show specific examples at the time of implementing the present invention, and the technical scope of the present invention must not be restrictively interpreted by these. That is, the present invention can be implemented in various forms without deviating from its technological idea or its main features. Specifically, a gist of the present invention is a respect that it has a switching unit, which switches an output from a monochromatic pixel, and an output from a color pixel, and outputs it to a post-stage, on a pathway between a plurality of pixels and a plurality of output circuits, and that an output signal from the switching unit is supplied to one of the plurality of above-mentioned output circuits. In each embodiment, it is specifically described where a switching unit is arranged. For example, it is good to arrange it in a pixel, between common output lines and an output circuit, or the like. In addition, it is enabled to make the number of a plurality of output circuits less than a sum total of numbers of color pixels and a monochromatic pixel included in a unit cell by providing the switching unit. In addition, a unit to stop an operation of each circuit can be also provided in every circuit. For example, it is good to stop only the operation of an output circuit where a signal from a monochromatic pixel is not output at the time of monochromatic image reading.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Laid-Open No. 2007-202990, filed Aug. 3, 2007, which is hereby incorporated by reference herein in its entirety.

What is claimed is:

1. A solid-state imaging apparatus comprising:
a plurality of unit cells, each having a plurality of color pixels corresponding respectively to different colors, a monochromatic pixel and a plurality of holding units for holding signals from the color pixels and the monochromatic pixel;
a plurality of common output lines to which output signals from the plurality of holding units corresponding respectively to color components of the plurality of color pixels; and
a plurality of output circuits receiving output signals from the plurality of common output lines, wherein
the apparatus further comprises a switching unit being disposed between the plurality of pixels and the plurality of output circuits, and switching between an output from the monochromatic pixel and an output from the color pixel, and an output signal from the switching unit is supplied to one of the plurality of output circuits.

2. The solid-state imaging apparatus according to claim 1, wherein
the color pixels included in one of the unit cells correspond respectively to different colors, and a number of the plurality of output circuits is larger than a total number of the color pixels and the monochromatic pixel in the one unit cell.

3. The solid-state imaging apparatus according to claim 1, wherein
the switching unit is arranged within the pixel.

4. The solid-state imaging apparatus according to claim 1, wherein
the switching unit is disposed between the common output line and the output circuit.

5. The solid-state imaging apparatus according to claim 1, wherein
the pixel comprises a photoelectric conversion element, a reset transistor for resetting the photoelectric conversion element and an input transistor of source follower type for receiving a signal from the photoelectric conversion element.

6. The solid-state imaging apparatus according to claim 5, further comprising
a stop unit for stopping an operation of the source follower of the monochromatic pixel at a time of reading a color image, and
for stopping an operation of the source follower of the color pixel, and an operation of the source follower of the pixel to which no signal is outputted from the monochromatic pixel at a time of reading a monochromatic image.

7. The solid-state imaging apparatus according to claim 1, wherein
the plurality of color pixels are ones for reading respectively red, green and blue components.

8. The solid-state imaging apparatus according to claim 1, wherein
the holding unit comprises a signal holding capacitor for holding a signal component from the pixel, and a noise holding capacitor for holding a noise component from the pixel, for subtracting from the signal component the noise component to suppress the noise component generated in the pixel.

9. The solid-state imaging apparatus according to claim 1, wherein
the holding unit comprises a clamping capacitor, a gain amplifier connected to the clamping capacitor and a clamping switch connected to an input of the gain amplifier, and the holding unit further comprises a signal holding capacitor for holding a signal amplified by the gain amplifier and a noise holding capacitor for holding an offset component of the gain amplifier, for subtracting from the signal held by the signal holding capacitor a signal held by the noise holding capacitor, to remove the offset component of the gain amplifier.

10. The solid-state imaging apparatus according to claim 9, further comprising
a stop unit for stopping an operation of the gain amplifier to which no signal is outputted from the monochromatic pixel at a time of reading a monochromatic image.

11. The solid-state imaging apparatus according to claim 1, wherein
at a time of reading a monochromatic image, an operation of the output circuit to which no signal is outputted from the monochromatic pixel is stopped.

12. The solid-state imaging apparatus according to claim 1, wherein
the plurality of unit cells, in each of which the plurality of pixels are arranged each color component by each color component along a column, are arranged in a direction perpendicular to an arrangement direction of the pixels in the unit cell, the plurality of holding units in the same unit cell are arranged at one side of the pixel columns of the plurality of unit cells, and the plurality of holding units of adjacent unit cells are arranged at the other side of the pixel columns of the plurality of unit cells.

13. The solid-state imaging apparatus according to claim 12, wherein
the pixels of at least two color components in the unit cell are connected to the same holding unit, and are arranged in adjacent to each other in an arrangement direction of the unit cells.

14. The solid-state imaging apparatus according to claim 1, wherein
the plurality of color pixels are arranged in one direction plural pixels by plural pixels in a column manner.

* * * * *